US009239865B1

(12) United States Patent
Balez et al.

(10) Patent No.: US 9,239,865 B1
(45) Date of Patent: Jan. 19, 2016

(54) SYSTEMS, METHODS, AND COMPUTER-READABLE MEDIA FOR PROVIDING RECOMMENDED ENTITIES BASED ON A QUERY-SPECIFIC SUBSET OF A USER'S SOCIAL GRAPH

(71) Applicant: Google Inc., Mountain View, CA (US)

(72) Inventors: Mat Balez, San Francisco, CA (US); John Alastair Hawkins, London (GB); Walter Korman, San Francisco, CA (US)

(73) Assignee: GOOGLE INC., Mountain View, CA (US)

( * ) Notice: Subject to any disclaimer, the term of this patent is extended or adjusted under 35 U.S.C. 154(b) by 225 days.

(21) Appl. No.: 13/745,053

(22) Filed: Jan. 18, 2013

(51) Int. Cl.
*G06F 17/30* (2006.01)

(52) U.S. Cl.
CPC .................................. *G06F 17/3053* (2013.01)

(58) Field of Classification Search
None
See application file for complete search history.

(56) References Cited

U.S. PATENT DOCUMENTS

| 8,010,418 | B1 | 8/2011 | Lee | |
|---|---|---|---|---|
| 2008/0228776 | A1* | 9/2008 | Weiss et al. | 707/10 |
| 2010/0262658 | A1 | 10/2010 | Mesnage | |
| 2010/0312644 | A1 | 12/2010 | Borgs | |
| 2011/0035329 | A1 | 2/2011 | Delli Santi | |
| 2011/0113100 | A1* | 5/2011 | Chawla | 709/205 |
| 2011/0238762 | A1 | 9/2011 | Soni | |
| 2012/0078916 | A1* | 3/2012 | Tseng | 707/748 |
| 2013/0031106 | A1* | 1/2013 | Schechter et al. | 707/749 |
| 2013/0173633 | A1* | 7/2013 | Piepgrass et al. | 707/748 |
| 2014/0164511 | A1* | 6/2014 | Williams et al. | 709/204 |

FOREIGN PATENT DOCUMENTS

| JP | 2009104450 A | 5/2009 |
|---|---|---|
| WO | 2010141656 A1 | 12/2010 |

OTHER PUBLICATIONS

Bandara, Udana, et al., "Tagciti: A Practical Approach for Location-Aware and Socially-Relevant Information Creation and Discovery for Mobile Users", IEEE ISWCS, 2008, pp. 118-122.
Copending U.S. Appl. No. 13/665,644, entitled "Methods and Computer-Readable Media for Providing Recommended Entities Based on a User's Social Graph," by Sebastian Dorner filed Oct. 31, 2012.

* cited by examiner

*Primary Examiner* — Jay Morrison
(74) *Attorney, Agent, or Firm* — Marshall, Gerstein & Borun LLP

(57) ABSTRACT

Provided are systems, methods, and computer-readable media for providing recommended entities responsive to a search query based on a query-specific subset of contacts from a user's social graph. A search query is received from a user that includes an identifier identifying a subset of the user's social graph. The entities responsive to the search query are identified, and those entities having evaluations by or other associations with contacts from the identified subset are also identified. In response to the search query, those entities having associations with the contacts in the identified subset of the user's social graph are provided as recommended entities in the search results.

22 Claims, 7 Drawing Sheets

SYSTEMS, METHODS, AND COMPUTER-READABLE MEDIA FOR PROVIDING RECOMMENDED ENTITIES BASED ON A QUERY-SPECIFIC SUBSET OF A USER'S SOCIAL GRAPH

BACKGROUND OF THE INVENTION

1. Field of the Invention

This invention relates generally to computer-implemented searching of the Internet and, more particularly, to providing businesses and other entities of interest to a user.

2. Description of the Related Art

The Internet is useful for a variety of purposes. For example, users may use the Internet to search geographic areas, such as to retrieve information about businesses or other entities located in a geographic area. Although information about such entities may be generally available in some form, the information, and the presentation of the information, may be nearly random and unstructured and may not present interesting information to a user. Additionally, the sources for such information may be unknown to user, or the user may find the sources for such information to be unreliable or untrustworthy. Consequently, a user may be unable to easily determine entities in a geographic area that are of interest to the user

SUMMARY OF THE INVENTION

Various embodiments of methods, computer-readable media, and systems determining recommended entities for a user based on the user's social graph are provided herein. In some embodiments, a method for determining recommended entities for a user based on the user's social graph is provided. The method includes receiving, at one or more processors, a search query from the user and an identifier for a subset of the user's social graph, identifying, by one or more processors, a plurality of entities that match the search query, and identifying, by one or more processors, one or more contacts in a subset of the user's social graph based on the identifier. The method further includes determining, by one or more processors, a selected one of the plurality of entities associated with one or more of the identified contacts and providing, by one or more processors, a subset of the plurality of entities including the selected one of the plurality entities as search results responsive to the search query.

Additionally, in some embodiments, a non-transitory tangible computer-readable storage medium having executable computer code stored thereon for determining recommended entities for a user based on the user's social graph is provided. The code includes a set of instructions that causes one or more processors to perform the following: receiving, at one or more processors, a search query from the user and an identifier for a subset of the user's social graph and identifying, by one or more processors, a plurality of entities that match the search query. The set of instructions further case the one or more processors to perform the following; identifying, by one or more processors, one or more contacts in a subset of the user's social graph based on the identifier, determining, by one or more processors, a selected one of the plurality of entities associated with one or more of the identified contacts, and providing, by one or more processors, a subset of the plurality of entities including the selected one of the plurality entities as search results responsive to the search query.

Further, in some embodiments, a system for determining recommended entities for a user based on the user's social graph is provided. The system includes one or more processors and a tangible non-transitory memory accessible by the one or more processors, the memory having computer code stored thereon. The code comprising a set of instructions that causes one or more processors to perform the following: receiving, at one or more processors, a search query from the user and an identifier for a subset of the user's social graph and identifying, by one or more processors, a plurality of entities that match the search query. The set of instructions further case the one or more processors to perform the following; identifying, by one or more processors, one or more contacts in a subset of the user's social graph based on the identifier, determining, by one or more processors, a selected one of the plurality of entities associated with one or more of the identified contacts, and providing, by one or more processors, a subset of the plurality of entities including the selected one of the plurality entities as search results responsive to the search query.

Figure 1:
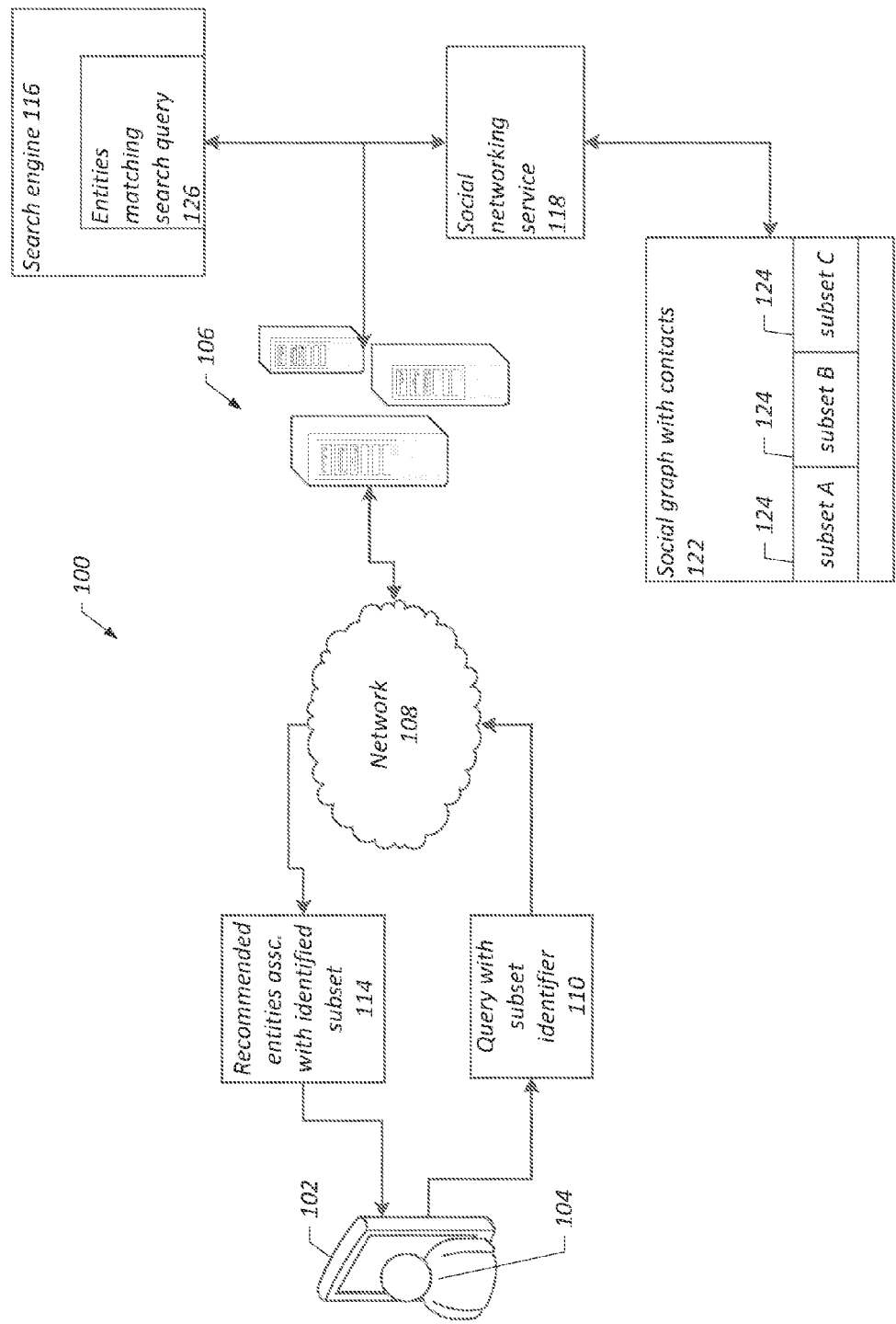
FIG. 1 is a diagram of a system for providing recommended entities in accordance with an embodiment of the present invention.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION

As discussed in more detail below, provided in some embodiments are systems, methods, and computer-readable media for providing recommended entities responsive to a computer-implemented search based on a query-specific subset of contacts from a user's social graph. In some embodiments, a search query is received from a user that includes an identifier identifying a subset of the user's social graph. The contacts in the subset are identified and provide the basis for determining recommended entities in search results responsive to the search query. The entities responsive to the search query are identified, and those entities having evaluations by or other associations with contacts from the identified subset are also identified. In response to the search query, those entities having associations with the contacts in the identified subset of the user's social graph are provided as recommended entities in the search results.

In some embodiments, the entities having such associations are provided as recommended entities and may be boosted in a ranking of the search results. In some embodiments, the recommended entities may be visually distinguished in the search results, such as by displaying the recommended entities in a first display mode and the entities without associations in a second display mode. Additionally, the association information, such as review text, ratings, name of the associated contact, and other information, may be annotated to the entities presented in the search results.

FIG. 1 is a diagram of a system 100 in accordance with an embodiment of the present invention. As shown in FIG. 1, the system 100 may include a client computer 102, e.g., a portable computer, for use by a user 104. The system may include servers 106 for providing services, webpages, and other data to the client computer 102, and the servers 106 and client computer 102 may communicate over a network 108. The client computer 102 may include laptop computers, tablet computers, smartphones, personal digital assistants, etc., and may include a receiver for a satellite-based positioning system, such as a Global Positioning System (GPS) receiver. In some embodiments, the client computer 102 may include a desktop computer. The user 104 may use the portable computer 102 to retrieve information, view interactive maps, and perform searches, such as by searching the World Wide Web using a web-based search engine or by searching an interactive map of a geographic area. Such geographic areas may include postal codes, cities, states, districts, provinces, neighborhoods, countries, areas near a specific address, or any other suitable geographic area. Additionally, as described below, the user 104 may use the client computer 102 to interact with a social networking service.

The servers 106 may include a single server (in a discrete hardware component or as a virtual server) or multiple servers. The servers 106 may include web servers, application servers, or other types of servers. Additionally, the servers 106 may be, for example, computers arranged in any physical and virtual configuration, such as computers in one or more data processing centers, a distributed computing environment, or other configuration. Such configurations may use the network 108 for communication or may communicate over other networks.

The client computer 102 and servers 106 are in communication with the network 108, such as through a wired or wireless network interface. In some embodiments, the network 108 may include multiple networks, and may include any suitable network and networking technology, such as the Internet, an intranet, a local area network (LAN), a wide area network (WAN), or any other suitable network. Additionally, the network 108 may include a wired network, a wireless network, or both. Moreover, it should be appreciated that the client computer 102 and servers 106 may communicate over different networks separately and simultaneously. For example, the client computer 102 may communicate over both a wireless Ethernet network and a cellular network.

As described in more detail below, the user 104 may use the client computer 102 to perform a computer-implemented search, such as by searching a geographic area for restaurants, retail stores, bars, etc. In such embodiments, a search query 110 with a social graph subset identifier is transmitted from the client computer 102 over the network 108 to the servers 106. In response, the servers 106 may transmit search results having recommended entities 114 based on associations with contacts from the identified subset of the user's social graph. As used herein, the term "entity" refers to a private or public entity having a physical location, such as a business (e.g., restaurant, bar, store, etc.), a public facility (e.g., a park, library, etc.), a government office (e.g., Department of Public Safety (DPS) office, courthouse), and the like.

As described in further detail below, the recommended entities 114 are determined from the entities having associations with (e.g., evaluated by) the contacts from an identified subset of a user's social graph, such as a social graph obtained from a social networking service. Search results that include the recommended entities 114 are received by the client 102 and displayed to the user 104. Additionally, in some embodiments and as described further below, the recommended entities 114 are annotated with association information such as review text, ratings, and other association information.

The servers 106 may include or be communication with a search engine 116 and a social networking service 118. These components may communicate over the network 108, other suitable networks. The social networking service 118 includes a social graph 122 for the user 104. The social graph 122 includes one or more contacts having a relationship with the user as defined by the social networking service 118. In some embodiments, the social graph is an external social graph. As used herein, the term "external social graph" refers to a social graph that is external to the other components of the system 100. As an external social graph, the social graph 122 may be defined independently of the other components of the system, such as the search engine 116. For example, the external social graph 122 of the social networking service 118 may be separate and independent relative to the other components of the system 100.

The social graph 122 includes subsets of contacts, such as the subsets 124 depicted in FIG. 1. For example, the social graph 122 includes subset A, subset B, and subset C. The subsets include one or more contacts of the social graph 122 that have a grouping relative to the other contacts in the social graph 122. For example, the subsets 124 may include subsets of relatives, immediate family, co-workers, classmates, professional contacts, or any other suitable group.

The search engine 116 retrieves entities 126 located in a geographic area, such as in response to a request from the client computer 102. As described further below, the recommended entities 114 may be determined based on associations with contacts from a subset 124 of the social graph 122, such as evaluations (e.g., ratings and reviews) of the entities by the contacts. The recommended entities 114 and other entities responsive to a request are provided to the client computer 102 for display to a user. As described below, the recommended entities 114 can be displayed in a ranked list of entities and may be distinguished from entities in the search results that do not have associations with contacts from the subset 124 of the user's social graph 122. Accordingly, because the recommended entities 114 are determined from the user's social graph 122, they may be of particular interest to the user, and the reviews, ratings or other evaluations from contacts of the user's social graph of the entities may also be of particular interest.

Figure 2:
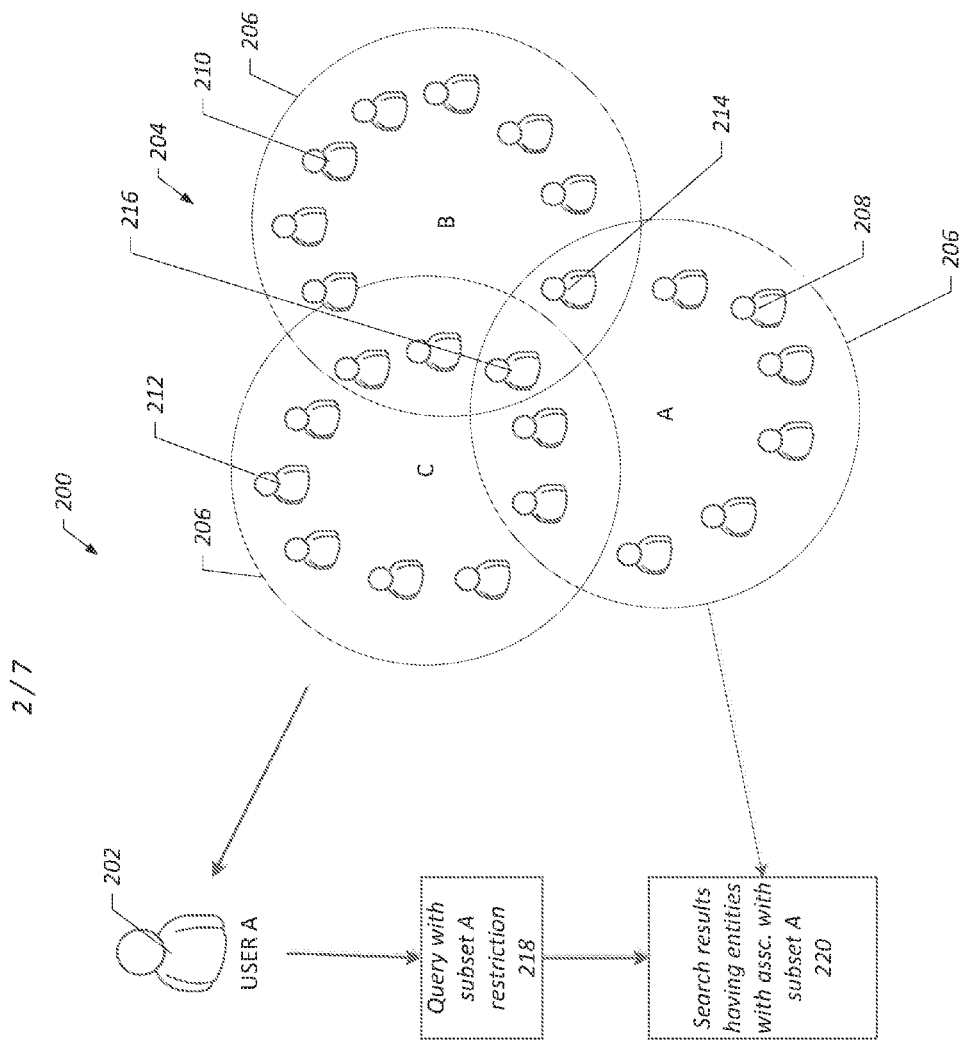
FIG. 2 is a diagram of a model of a social graph in accordance with an embodiment of the present invention.

FIG. 2 depicts a schematic diagram 200 of a social graph for a user 202 (User A) in accordance with embodiments of the present invention. As shown in FIG. 2, the user 202 (User A) has a social graph 204 having subsets 206, e.g., subset A, subset B, and subset C. The subset A includes users 208, the subset B includes users 210, and the subset C includes users 212. Additionally, in some the embodiments the subsets include overlapping contacts. For example, contact 214 is included in subsets A and B, and contact 216 is included in subsets A, B, and C. In some embodiments, the organization of contacts in a social graph includes or is referred to as a "circle." Additionally, in some embodiments, the social graph 204 is an asymmetric social graph, such that User A receives updates (e.g., status updates, location updates, news feeds, posts, etc.) from the contacts of social graph 204, but the contacts included in social graph 204 do not receive updates from User A.

As mentioned above, User A executes a search query 218 having a subset identifier. For example, the search query 218 may include an identifier for subset A. Thus, as described further below, search results 220 are provided that include entities having associations with the contacts from subset A of the social graph 204, and the entities having associations are provided as recommended entities in the search results 220. For example, an entity having an association with contact 208 (e.g., reviewed by contact 208) may be provided as a recommended entity in the search results 220. Similarly, an entity having an association with contact 214 (e.g., rated by the contact 214) may be provided as a recommended entity in the search results 220.

Figure 3A:
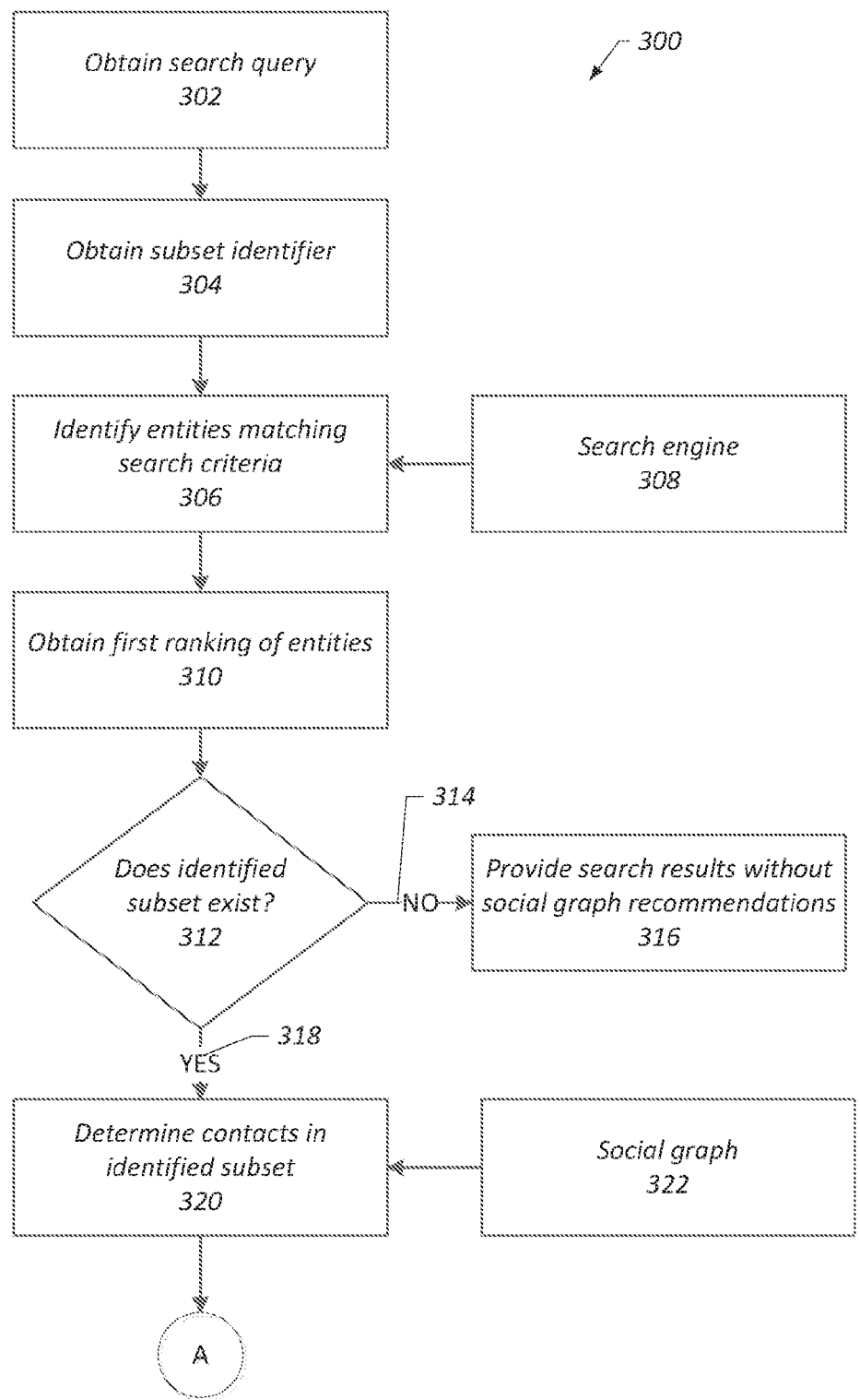
FIGS. 3A and 3B are block diagrams of a process for determining and providing recommended entities in accordance with an embodiment of the present invention.

FIG. 3A depicts a process 300 for determining and providing recommended entities in accordance with embodiments of the present invention. Some or all steps of the process 300 may be implemented as executable computer code stored on a non-transitory tangible computer-readable storage medium and executed by one or more processors of a special-purpose machine, e.g., a computer programmed to execute the code. Initially, a search query is obtained (block 302), such as a search query entered by a user and transmitted from a client computer. As noted above, the search query may include a geographic area and may include searches for types of entities, entities located in a geographic area, or types of entities located in a geographic area.

Additionally, a subset identifier is obtained (block 304) that identifies a subset of a social graph associated with the user. In some embodiments, the subset identifier is a Uniform Resource Locator (URL) parameter provided with a URL for a search engine or other service executing the search query. As illustrated below in FIG. 5, the subset identifier is generated from a user's selection, such as a selection from a drop-down list. Moreover, in some embodiments, multiple subset identifiers are obtained for a search query.

Next, the entities matching the search criteria are identified (block 306) from a search engine 308. For example, the entities located in a geographic area (e.g., San Francisco) are determined by the search engine 308, or entities matching a search query (e.g., "pizza") are determined by the search engine 308. Additionally, a ranking of the entities matching the search criteria is obtained (block 310). The ranking is provided by the search engine 308 or obtained from data included with the entities. The ranking may be based on a first set of ranking criteria, such as popularity (popularity of an entity), relevance (how well an entity matches a search query), and location (the distance between an entity and a specified geographic location).

Next, the existence of the identified subset is determined (decision block 312). If the identified subset does not exist (line 314), then the search results responsive to the search query are provided without recommendations from the user's social graph (block 316). If the identified subset exists (line 318), the contacts in the identified subset are identified (block 320), such as from the user's social graph 322. The contacts from the identified subset are used to determine recommended entities in the search results responsive to the search query. In some embodiments, the social graph 322 is a social graph from a social networking service. As also described above, in some embodiments the social graph is external to the search engine 308. Thus, a user may manage the external social graph via a social networking service without interacting with the search engine 308 or other services or systems.

For example, the social graph 322 may be provided from a different service provider than the search engine 308. As noted above, the social graph 322 may include multiple subsets of contacts, and a subset may include one or more contacts. Moreover, as noted above, in some embodiments the social graph 322 is an asymmetric social graph.

Figure 3B:
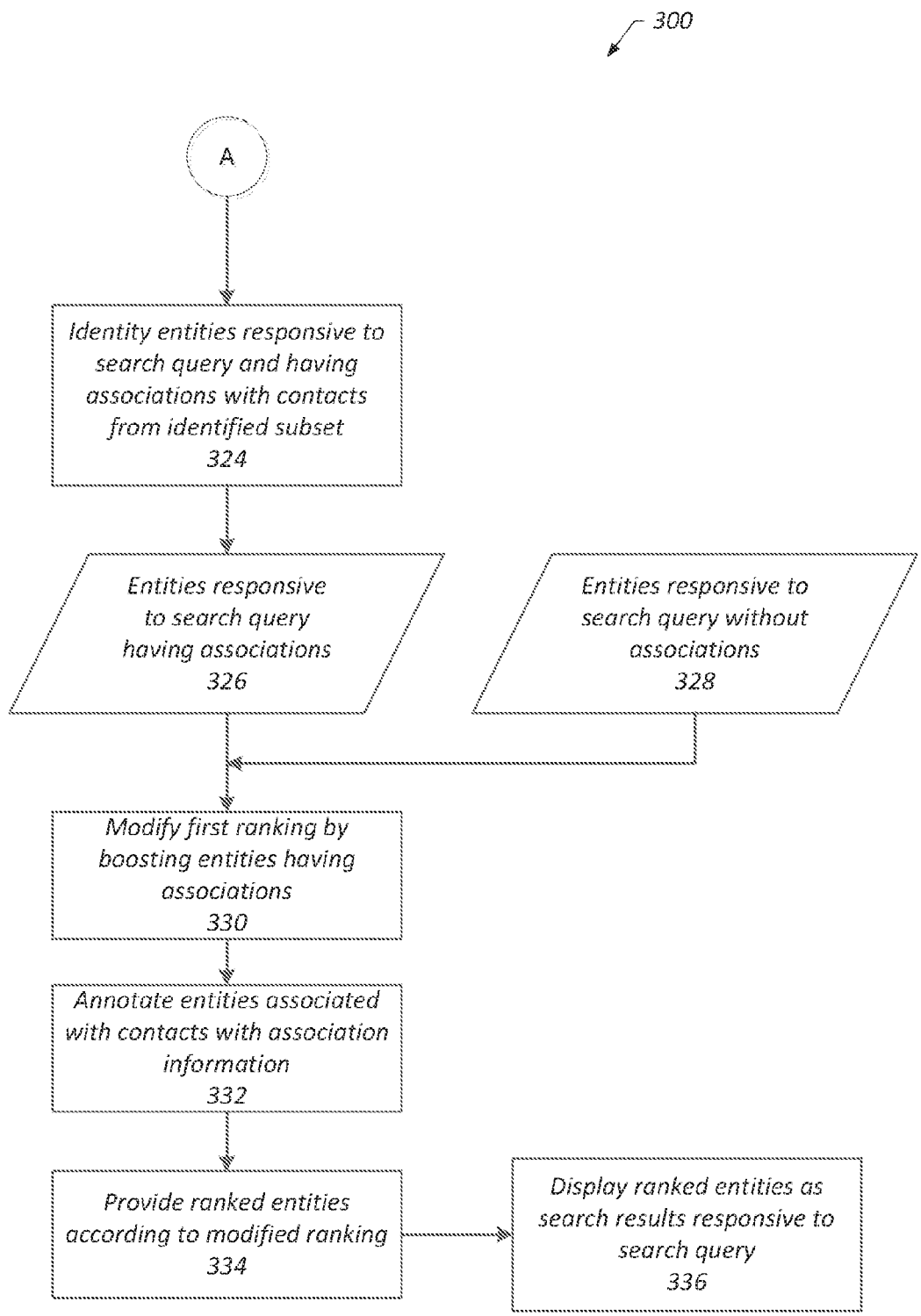

The process 300 is further illustrated in FIG. 3B, as indicated by connector block A. Next, as shown in FIG. 3B, after obtaining the contacts from the identified subset of the user's social graph, the entities responsive to the search query and having associations with the contacts from the identified subset are determined (block 324). As described further below, an association may be determined based any suitable interaction between a contact and an entity, such as a contact's review of the entity, a contact's rating of the entity, a contact's "check-in" or "check-out" from an entity, and the like. Moreover, an entity may have one or more associations with a contact, and an entity may have associations with one or more contacts.

Each association may include association information describing details about the association. For example, if the association is based on an evaluation (e.g., a review, a rating, or a combination thereof) of the entity by the contact, the association information may include the date and time of the evaluation, review text, a rating, and so on. Additionally, the association information may include the name of the associated contact and a picture of the associated contact. Further, in some embodiments, the association may include an image, such as an image provided by the associated contact.

Accordingly, the entities 326 responsive to the search query having associations with the contacts of the identified subset and the entities 328 responsive to the search query without such associations are determined. In some embodiments, the contacts associated with each entity are ranked based on relationship criteria describing a relationship between the contact and the user. The relationship criteria include the number of interactions between a contact and a user and the type of interactions between a contact and user. For example, those contacts having a higher qualitative relationship with the contact may be ranked higher than those contacts having a lower qualitative relationship.

Next, the ranking of the entities (i.e., both the entities 326 having associations and the entities 328 without associations) is modified based on the associations (block 330) to produce a re-ranked list of entities. For example, the ranking is modified by boosting the entities 326 having associations to increase their rank in the modified ranking of entities. Next, the entities having associations are annotated with association information from the association (block 332). For example, if the association between an entity and a contact was based on a contact's review of the entity, the entity is annotated with some or all of the text from the review. Similarly, if the association between an entity and a contact was based on a contact's rating of the entity, the entity is annotated with the rating. In some embodiments, a flag or other indicator associated with a contact is read to determine if a contact allows the reviews, ratings, or other evaluations to be public. Additionally, an entity may be annotated with information from multiple interactions, such as combination of a ranking and text from a review, multiple associations, or a combination thereof.

Next, the entities are provided according to the modified ranking, and the annotated entities are provided as recommended entities for a user (block 334). In other embodiments, the entities are provided as unranked entities or are ranked according to different set of ranking criteria. The entities are transmitted to the client computer originating the search and displayed as search results responsive to the search query (block 336). Additionally, as described below, the recommended entities (i.e., those entities associated with the contacts of the identified subset) are displayed in a first display mode and the entities without association are displayed in a second display mode.

Figure 4:
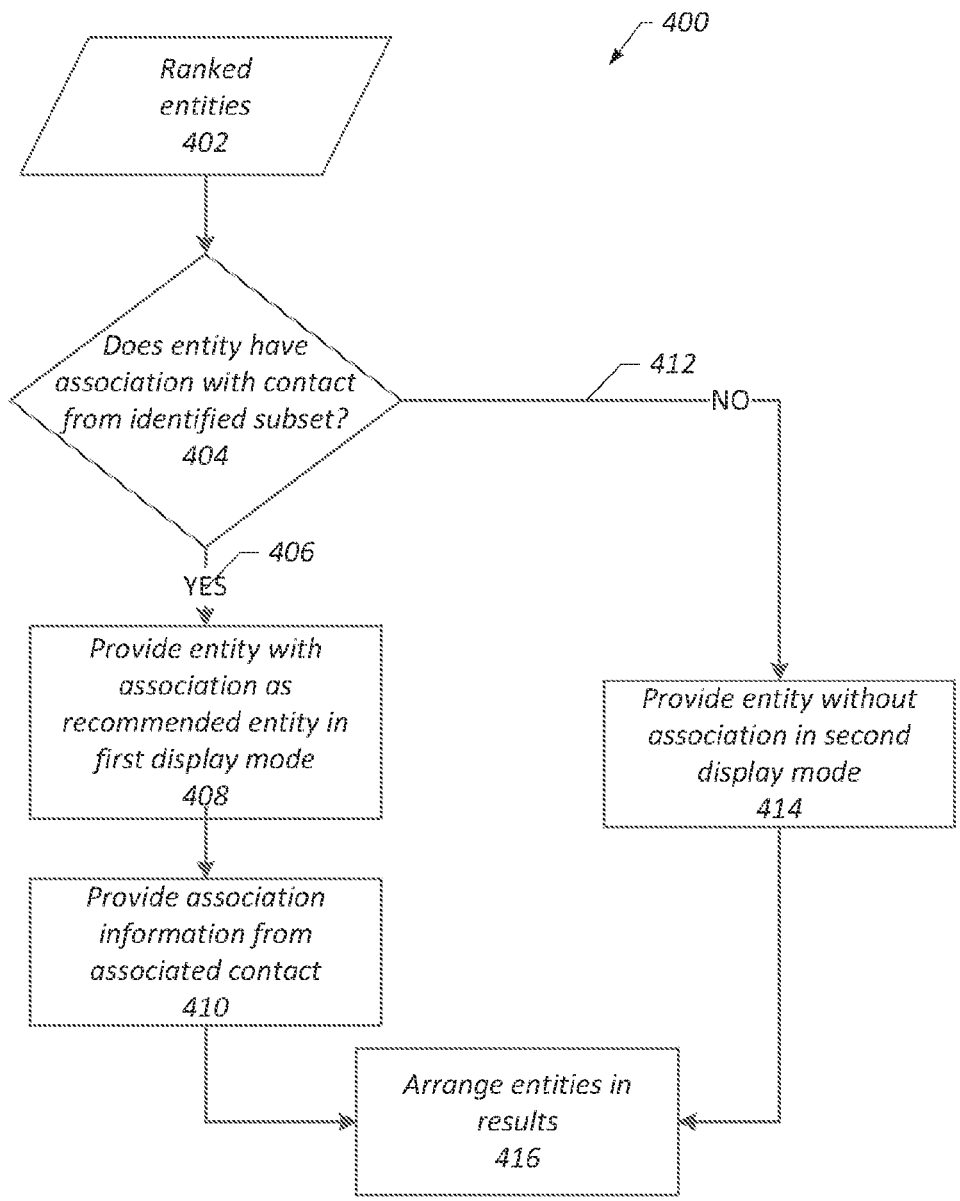
FIG. 4 is a block diagram of a process for further processing recommended entities in accordance with an embodiment of the present invention.

After determining and ranking entities that have contact associations, the ranked entities are further processed to display recommended entities to a user. FIG. 4 depicts a process 400 for further processing ranked entities 402 in accordance with embodiments of the present invention. Some or all steps of the process 400 may be implemented as executable computer code stored on a non-transitory tangible computer-readable storage medium and executed by one or more processors of a special-purpose machine, e.g., a computer programmed to execute the code. Initially, as described above, ranked entities 402 are determined, such that those entities having associations with contacts from a user's external social graph are boosted within the rankings Each entity is then evaluated to determine if the entity has an association with a contact from the identified subset (decision block 404).

If an entity has an association with a contact (line 406), the entity is provided as a recommended entity in a first display mode (block 408). The first display mode may include a font, text size, style, color, other visual parameters, or combination thereof. Additionally, as shown in detail below, the entity is provided with association information, such as the name of the contact, an image associated with the contact, a review or rating by the contact, etc. (block 410). If the entity does not have an association with a contact (line 412), the entity is provided in the search results in a second display mode (block 414). Here again, the second display mode may include the font, text size, style, color, other visual parameters, or combination thereof.

Next, the entities are arranged based on the determination of recommended entities (block 416). In some embodiments, recommended entities are displayed in a different area, above the additional entities, visually highlighted, or otherwise distinguished from the additional entities. As described above, for example, the first display mode may be different than the second display mode such that the recommended entities are visually highlighted in the search results. In some embodiments, the entities are provided according to the modified ranking, without additional processing to distinguish the recommended entities.

Figure 5:
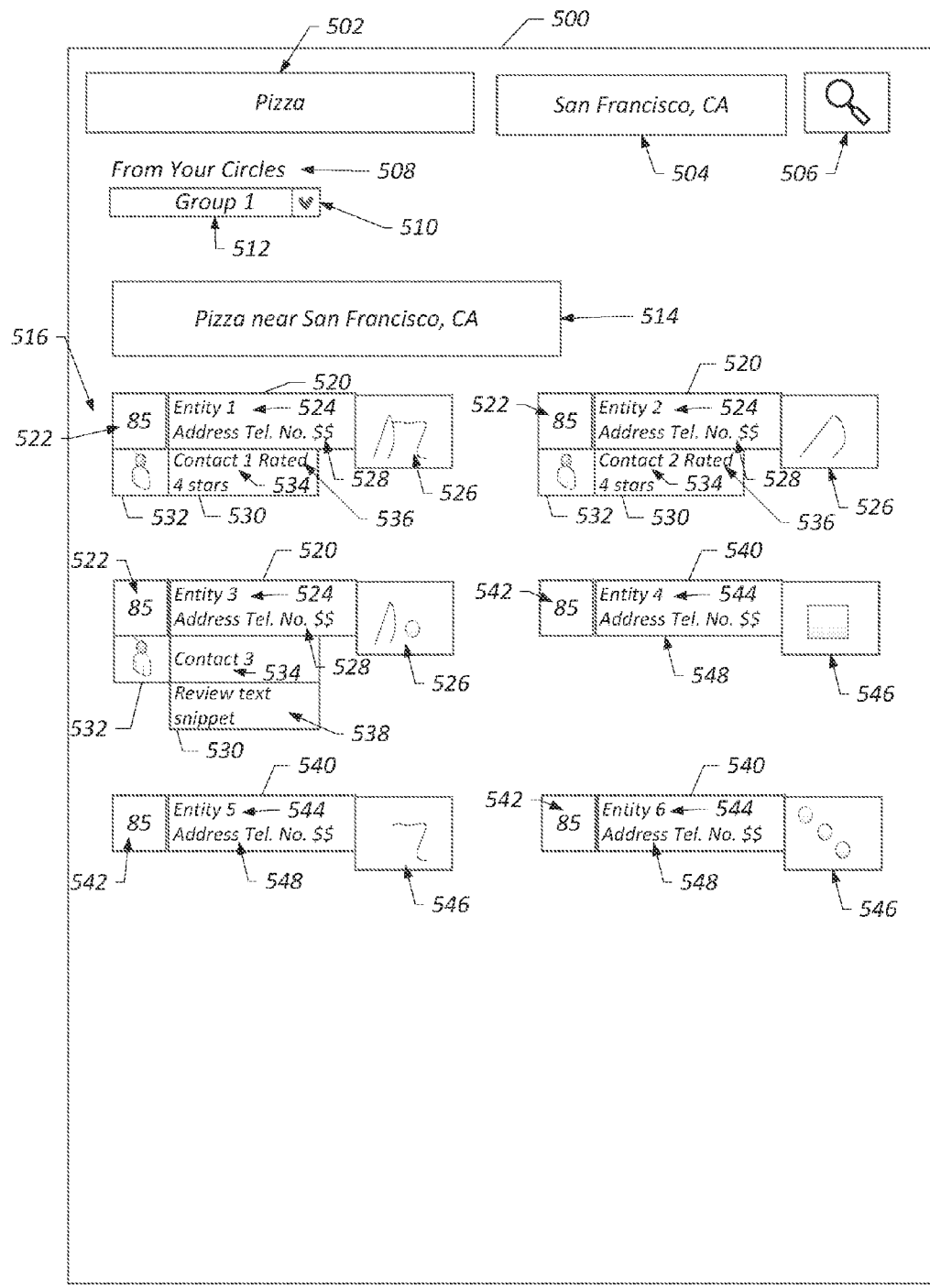
FIG. 5 is a schematic diagram of a screenshot illustrating the display of search results having recommended entities and annotated association information in accordance with an embodiment of the present invention.

FIG. 5 depicts a screenshot 500 illustrating the display of search results having recommended entities and annotated associations in accordance with embodiments of the present invention. The screenshot 500 is from a browser or other application executing on a client computer, such as the client computer 102 described above. For example, the screenshot 500 depicts a webpage, such as a webpage of web-based search engine, etc. The screenshot 500 depicts a search field 502, a location field 504, and a search button 506. Additionally, the screenshot 500 depicts a social graph subset selector 508 having a dropdown list 510 and an identified subset 512. The screenshot 500 also depicts a search title bar 514 and search results 516.

The search field 502 provides for the entry of a search query, such as a search query that includes a location, a specific entity, type of entity, etc. The search button 506 provides for a user to execute a search. For example, a user may enter text (e.g., "Pizza") in the search field 502 and select (e.g., click) the button 506. As mentioned above, a user may search for a location, the type of entities located in a geographic area, a specific entity, and so on. The location field 504 displays a geographic area of interest (e.g., "San Francisco, Calif."). In some embodiments, the geographic area of interest is determined from the location of a client computer, such as from a location determine via a satellite-based positioning system (e.g., GPS), IP address geolocation, etc. In other embodiments, the geographic area of interest is manually input by a user, such as by entering a location in the search field 502.

The social graph subset selector 508 includes a title (e.g., "From Your Circles") indicating to the user that search results may be influenced by a selected subset of the user's social graph. A user selects the subset 512 of their social graph via the dropdown list 510. For example, as shown in FIG. 5, the subset "Group 1" is selected. The dropdown list 510 may be populated with subsets obtained from the user's social graph or from other determinations of subsets, such as a pregenerated list of possible subsets.

The search results section 516 includes a number of recommended entities 520 (e.g., "Entity 1," "Entity 2," and "Entity 3") determined in the manner described above. Various information about each recommended entity 520 is displayed, such as a score 522 for the entity, a name 524 of the entity, a picture 526 for the entity, and other information 528, e.g., an address (e.g., "Address"), a telephone number (e.g., "Tel. No.), and a price level (e.g., "$$") for each recommended entity 520. As described above, the recommended entities 520 are those entities having associations with contacts from the identified subset 512 of the user's social graph. Accordingly, as described above, each recommended entity 520 is annotated with the association information 530 that resulted in the determination of the recommended entity 514. For example, the association information 530 includes a picture 532 of the contact, the name 534 of the contact (e.g., "Contact 1," "Contact 2," and "Contact 3,"), and evaluations by the contact, e.g., a rating 536, review text 538, or other information or combination thereof from the association. As described above, the association information 530 for each recommended entity 520 may be obtained from the highest ranked contact associated with the recommended entity 520.

As noted above, entities without associations may also be included in the search results. Accordingly, as shown in FIG. 5, additional entities 540 without associations may also be displayed in the search results 516. The entities include similar information to the recommended entities, such as a score 542 for the entity, a name 544 of the entity, a picture 546 for the entity, and other information 548, e.g., an address (e.g., "Address"), a telephone number (e.g., "Tel. No.), and a price level (e.g., "$$") for each entity 532. As shown in FIG. 5, the recommended entities 520 are displayed above the additional entities 540 without associations. For example, the recommended entities may be displayed in this position based on a modified ranking, as described above. In some embodiments, the recommended entities 520 may be displayed in a first display mode and the entities 540 without associations may be displayed in a second display mode, such that the first display mode includes a different text size, font, color, style, etc., than the second display mode to visually distinguish the recommended entities 520 in the search results 516.

Figure 6:
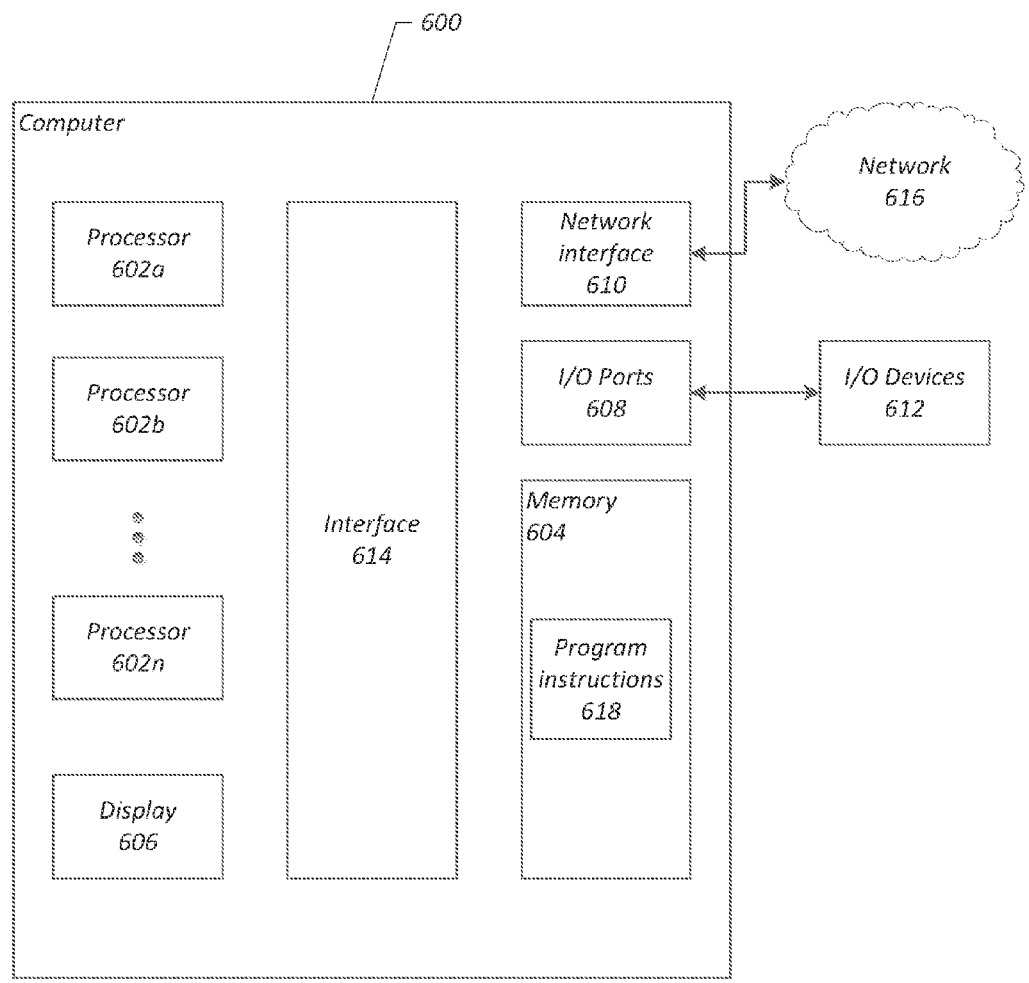
FIG. 6 is a block diagram of a computer in accordance with an embodiment of the present invention.

FIG. 6 depicts a computer 600 in accordance with an embodiment of the present invention. Various portions or sections of systems and methods described herein include or are executed on one or more computers similar to computer 600 and programmed as special-purpose machines executing some or all steps of methods described above as executable computer code. Further, processes and modules described herein may be executed by one or more processing systems similar to that of computer 600.

The computer 600 may include various internal and external components that contribute to the function of the device and which may allow the computer 600 to function in accordance with the techniques discussed herein. As will be appreciated, various components of computer 600 may be provided as internal or integral components of the computer 600 or may be provided as external or connectable components. It should further be noted that FIG. 6 depicts merely one example of a particular implementation and is intended to illustrate the types of components and functionalities that may be present in computer 600. As shown in FIG. 6, the computer 600 may include one or more processors (e.g., processors 602a-602n) coupled to a memory 604, a display 606, I/O ports 608 and a network interface 610, via an interface 614.

Computer 600 may include any combination of devices or software that may perform or otherwise provide for the performance of the techniques described herein. For example, computer 600 may include or be a combination of a cloud-computing system, a data center, a server rack or other server enclosure, a server, a virtual server, a desktop computer, a laptop computer, a tablet computer, a mobile telephone, a smartphone, a personal digital assistant (PDA), a media player, a game console, a vehicle-mounted computer, or the like. Computer 600 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

In addition, the computer 600 may allow a user to connect to and communicate through a network 616 (e.g., the Internet, a local area network, a wide area network, etc.) and to acquire data from a satellite-based positioning system (e.g., GPS). For example, the computer 600 may allow a user to communicate using e-mail, text messaging, instant messaging, or using other forms of electronic communication, and may allow a user to obtain the location of the device from the satellite-based positioning system, such as the location on an interactive map.

In one embodiment, the display 606 may include a liquid crystal display (LCD) or an organic light emitting diode (OLED) display, although other display technologies may be used in other embodiments. The display 606 may display a user interface (e.g., a graphical user interface). In accordance with some embodiments, the display 606 may include or be provided in conjunction with touch sensitive elements through which a user may interact with the user interface. Such a touch-sensitive display may be referred to as a "touch screen" and may also be known as or called a touch-sensitive display system.

The processor 602 may provide the processing capability required to execute the operating system, programs, user interface, and any functions of the computer 600. The processor 602 may receive instructions and data from a memory (e.g., system memory 604). The processor 602 may include one or more processors, such as "general-purpose" microprocessors, and special purpose microprocessors, such as ASICs. For example, the processor 602 may include one or more reduced instruction set (RISC) processors, such as those implementing the Advanced RISC Machine (ARM) instruction set. Additionally, the processor 602 may include single-core processors and multicore processors and may include graphics processors, video processors, and related chip sets. Accordingly, computer 600 may be a uni-processor system including one processor (e.g., processor 602a), or a multi-processor system including any number of suitable processors (e.g., 602a-602n). Multiple processors may be employed to provide for parallel or sequential execution of one or more sections of the techniques described herein. Processes, such as logic flows, described herein may be performed by one or more programmable processors executing one or more computer programs to perform functions by operating on input data and generating corresponding output.

The memory 604 (which may include one or more tangible non-transitory computer readable storage medium) may include volatile memory, such as random access memory (RAM), and non-volatile memory, such as ROM, flash memory, a hard drive, any other suitable optical, magnetic, or solid-state storage medium, or a combination thereof. The memory 604 may be accessible by the processor 602 and other components of the computer 600. The memory 604 may store a variety of information and may be used for a variety of purposes. The memory 604 may store executable computer code, such as the firmware for the computer 600, an operating system for the computer 600, and any other programs or other executable code necessary for the computer 600 to function. The executable computer code may include program instructions 618 executable by a processor (e.g., one or more of processors 602a-602n) to implement one or more embodiments of the present invention, such as processes 300 and 400 described above. Instructions 618 may include modules of computer program instructions for implementing one or more techniques described herein with regard to various processing modules. Program instructions 618 may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, a subroutine. A computer program may or may not correspond to a file in a file system. A program may be stored in a section of a file that holds other programs or data (e.g., one or more scripts stored in a markup language document), in a single file dedicated to the program in question, or in multiple coordinated files (e.g., files that store one or more modules, sub programs, or sections of code). A computer program may be deployed to be executed on one or more computer processors located locally at one site or distributed across multiple remote sites and interconnected by a communication network. In addition, the memory 604 may be used for buffering or caching during operation of the computer 600. The memory 604 may also store data files such as media (e.g., music and video files), software (e.g., for implementing functions on computer 600), preference information (e.g., media playback preferences), wireless connection information (e.g., information that may enable media device to establish a wireless connection), telephone information (e.g., telephone numbers), and any other suitable data.

As mentioned above, the memory 604 may include volatile memory, such as random access memory (RAM). The memory 604 may also include non-volatile memory, such as ROM, flash memory, a hard drive, any other suitable optical, magnetic, or solid-state storage medium, or a combination thereof. The interface 614 may include multiple interfaces and may couple various components of the computer 600 to the processor 602 and memory 604. In some embodiments, the interface 614, the processor 602, memory 604, and one or more other components of the computer 600 may be implemented on a single chip, such as a system-on-a-chip (SOC). In other embodiments, these components, their functionalities, or both may be implemented on separate chips. The interface 614 may be configured to coordinate I/O traffic between processors 602a-602n, system memory 604, network interface 610, I/O devices 612, other peripheral devices, or a combination thereof. The interface 614 may perform protocol, timing or other data transformations to convert data signals from one component (e.g., system memory 604) into a format suitable for use by another component (e.g., processors 602a-602n). The interface 614 may include support for devices attached through various types of peripheral buses, such as a variant of the Peripheral Component Interconnect (PCI) bus standard or the Universal Serial Bus (USB) standard.

The computer 600 may also include an input and output port 608 to allow connection of additional devices, such as I/O devices 612. Embodiments of the present invention may include any number of input and output ports 608, including headphone and headset jacks, universal serial bus (USB) ports, Firewire or IEEE-1394 ports, and AC and DC power connectors. Further, the computer 600 may use the input and output ports to connect to and send or receive data with any other device, such as other portable computers, personal computers, printers, etc.

The computer 600 depicted in FIG. 6 also includes a network interface 610, such as a wired network interface card (NIC), wireless (e.g., radio frequency) receivers, etc. For example, the network interface 610 may receive and send electromagnetic signals and communicate with communications networks and other communications devices via the electromagnetic signals. The network interface 610 may include known circuitry for performing these functions, including an antenna system, an RF transceiver, one or more amplifiers, a tuner, one or more oscillators, a digital signal processor, a CODEC chipset, a subscriber identity module (SIM) card, memory, and so forth. The network interface 610 may communicate with networks (e.g., network 616), such as the Internet, an intranet, a cellular telephone network, a wireless local area network (LAN), a metropolitan area network (MAN), or other devices by wireless communication. The communication may use any suitable communications standard, protocol and technology, including Ethernet, Global System for Mobile Communications (GSM), Enhanced Data GSM Environment (EDGE), a 3G network (e.g., based upon the IMT-2000 standard), high-speed downlink packet access (HSDPA), wideband code division multiple access (W-CDMA), code division multiple access (CDMA), time division multiple access (TDMA), a 4G network (e.g., IMT Advanced, Long-Term Evolution Advanced (LTE Advanced), etc.), Bluetooth, Wireless Fidelity (Wi-Fi) (e.g., IEEE 802.11a, IEEE 802.11b, IEEE 802.11g or IEEE 802.11n), voice over Internet Protocol (VoIP), Wi-MAX, a protocol for email (e.g., Internet message access protocol (IMAP) or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), Multimedia Messaging Service (MMS), Short Message Service (SMS), or any other suitable communication protocol.

Those skilled in the art will also appreciate that, while various items are illustrated as being stored in memory or on storage while being used, these items or sections of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer 600 may be transmitted to computer 600 via transmission media or signals such as electrical, electromagnetic, or digital signals, conveyed via a communication medium such as a network or a wireless link. Various embodiments may further include receiving, sending or storing instructions or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible/readable storage medium may include a non-transitory storage media such as magnetic or optical media, (e.g., disk or DVD/CD-ROM), volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" mean including, but not limited to. As used herein and unless otherwise indicated, statements that one value or action is "based on" another condition or value encompass both instances in which the condition or value is the sole factor and instances in which the condition or value is one factor among a plurality of factors." As used throughout this application, the singular forms "a", "an" and "the" include plural referents unless the content clearly indicates otherwise. Thus, for example, reference to "an element" includes a combination of two or more elements. Unless specifically stated otherwise, as apparent from the discussion, it is appreciated that throughout this specification discussions utilizing terms such as "processing", "computing", "calculating", "determining" or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical electronic or magnetic quantities within memories, registers, or other information storage devices, transmission devices, or display devices of the special purpose computer or similar special purpose electronic processing/computing device.

What is claimed is:

1. A computer-implemented method for determining recommended entities for a user based on the user's social graph, the method comprising:
receiving, at one or more processors, a search query from the user and an identifier for a subset of the user's social graph, wherein the subset of the user's social graph includes a plurality of contacts of the user and is selected by the user from among a plurality of subsets also each having a plurality of contacts of the user;
identifying, by one or more processors, a plurality of entities that match the search query;
identifying, by one or more processors, one or more contacts in a subset of the user's social graph based on the identifier;
determining, by one or more processors, a selected one of the plurality of entities associated with one or more of the identified contacts; and
providing, by one or more processors, the plurality of entities including the selected one of the plurality of entities as search results responsive to the search query in a search results display, wherein the selected entity is annotated with association information for at least one of the identified contacts including review text or a rating of the selected entity by the at least one identified contact and the selected entity is annotated with an indication of the at least one identified contact.

2. The method of claim 1, wherein providing the plurality of entities including the selected one of the plurality of entities as search results comprises ranking the plurality of entities based on whether each of the plurality of entities are associated with one or more of the identified contacts.

3. The method of claim 1, wherein providing the plurality of entities including the selected one of the plurality of entities as search results comprises presenting the selected one of the plurality of entities before any of the plurality of entities not associated with one or more of the identified contacts.

4. The method of claim 1, wherein the selected entity is presented in a first display mode and any of the plurality of entities that are not associated with the one or more contacts are presented in a second display mode.

5. The computer-implemented method of claim 4, comprising selecting one of the one or more associations and providing, by one or more processors, association information from the selected association for display with selected entity in the first display mode.

6. The method of claim 1, wherein the plurality of entities includes the selected one of the plurality of entities and at least one entity not associated with the one or more contacts.

7. The computer-implemented method of claim 1, wherein the one or more associations comprise at least one of: a rating of the selected one of the plurality of entities and a review of the selected one of the plurality of entities.

8. The computer-implemented method of claim 1, wherein the user's social graph is obtained from a social networking service.

9. The computer-implemented method of claim 1, wherein the user's social graph is an asymmetric social graph.

10. The computer-implemented method of claim 1, wherein receiving, at one or more processors, a search query from the user and an identifier for a subset of the user's social graph comprises receiving the identifier from a Uniform Resource Locator (URL) parameter.

11. The method of claim 1, wherein the search query identifies a geolocation, and wherein determining the selected one of the plurality of entities associated with one or more of the identified contacts comprises:
ranking a plurality of businesses based on popularity, relevance to the search query, distance between the geolocation and each business among the plurality of businesses, and reviews or ratings of each business among the plurality of businesses by the one or more identified contacts; and
selecting at least some of the plurality of businesses based on the ranking.

12. The method of claim 1, wherein the search query identifies a geolocation, and wherein determining the selected one of the plurality of entities associated with one or more of the identified contacts comprises:
determining the selected one of the plurality of entities based on an amount of interactions between the respective contacts and the user.

13. The method of claim 1, further comprising:
ranking, by the one or more processors, the identified contacts based on relationship criteria corresponding to a relationship between each of the identified contacts and the user in the user's social graph;
wherein the selected entity is annotated with association information for a highest ranked contact of the identified contacts associated with the selected entity.

14. A non-transitory tangible computer-readable storage medium having executable computer code stored thereon for determining recommended entities for a user based on the user's social graph, the code comprising a set of instructions that causes one or more processors to perform the following:
receiving, at one or more processors, a search query from the user and an identifier for a subset of the user's social graph, wherein the subset of the user's social graph includes a plurality of contacts of the user and is selected by the user from among a plurality of subsets also each having a plurality of contacts of the user;
identifying, by one or more processors, a plurality of entities that match the search query;
identifying, by one or more processors, one or more contacts in a subset of the user's social graph based on the identifier;
determining, by one or more processors, a selected one of the plurality of entities associated with one or more of the identified contacts; and
providing, by one or more processors, the plurality of entities including the selected one of the plurality of entities as search results responsive to the search query in a search results display, wherein the selected entity is annotated with association information for at least one of the identified contacts including review text or a rating of the selected entity by the at least one identified contact and the selected entity is annotated with an indication of the at least one identified contact.

15. The non-transitory tangible computer-readable storage medium of claim 14, wherein providing the plurality of entities including the selected one of the plurality of entities as search results comprises ranking the plurality of entities based on whether each of the plurality of entities are associated with one or more of the identified contacts.

16. The non-transitory tangible computer-readable storage medium of claim 14, wherein providing the plurality of entities including the selected one of the plurality of entities as search results comprises presenting the selected one of the plurality of entities before any of the plurality of entities not associated with one or more of the identified contacts.

17. The non-transitory tangible computer-readable storage medium of claim 14, wherein the selected entity is presented in a first display mode and any of the plurality of entities that are not associated with one or more of the identified contacts are presented in a second display mode.

18. The non-transitory tangible computer-readable storage medium of claim 14, wherein the one or more associations comprise at least one of: a rating of the selected one of the plurality of entities and a review of the selected one of the plurality of entities.

19. A system for determining recommended entities for a user based on the user's social graph, the system comprising
    one or more processors; and a tangible non-transitory memory accessible by the one or more processors, the memory having computer code stored thereon, the code comprising a set of instructions that causes one or more processors to perform the following:
    receiving, at one or more processors, a search query from the user and an identifier for a subset of the user's social graph, wherein the subset of the user's social graph includes a plurality of contacts of the user and is selected by the user from among a plurality of subsets also each having a plurality of contacts of the user;
    identifying, by one or more processors, a plurality of entities that match the search query;
    identifying, by one or more processors, one or more contacts in a subset of the user's social graph based on the identifier;
    determining, by one or more processors, a selected one of the plurality of entities associated with one or more of the identified contacts; and
    providing, by one or more processors, the plurality of entities including the selected one of plurality of entities as search results responsive to the search query in a search results display, wherein the selected entity is annotated with association information for at least one of the identified contacts including review text or a rating of the selected entity by the at least one identified contact and the selected entity is annotated with an indication of the at least one identified contact.

20. The system of claim 19, wherein providing the plurality of entities including the selected one of the plurality of entities as search results comprises ranking the plurality of entities based on whether each of the plurality of entities are associated with one or more of the identified contacts.

21. The system of claim 19, wherein providing the plurality of entities including the selected one of the plurality of entities as search results comprises presenting the selected one of the plurality of entities before any of the plurality of entities not associated with one or more of the identified contacts.

22. The system of claim 19, wherein the selected entity is presented in a first display mode and any of the plurality of entities that are not associated with one or more of the identified contacts are presented in a second display mode.

* * * * *